(12) United States Patent
Furuya et al.

(10) Patent No.: US 7,830,473 B2
(45) Date of Patent: Nov. 9, 2010

(54) LASER APPARATUS

(75) Inventors: Hiroyuki Furuya, Osaka (JP); Shinichi Shikii, Nara (JP); Tetsuro Mizushima, Osaka (JP); Akira Kurozuka, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 248 days.

(21) Appl. No.: 12/198,367

(22) Filed: Aug. 26, 2008

(65) Prior Publication Data

US 2009/0059116 A1    Mar. 5, 2009

(30) Foreign Application Priority Data

Sep. 3, 2007    (JP) ............................. 2007-227730
Dec. 5, 2007    (JP) ............................. 2007-314301

(51) Int. Cl.
*G02F 1/1335*    (2006.01)
*H01S 5/026*    (2006.01)
*H01S 3/13*    (2006.01)
*H01S 3/10*    (2006.01)
*G09F 13/04*    (2006.01)
*G02B 6/42*    (2006.01)

(52) U.S. Cl. ............................. 349/61; 349/95; 372/22; 372/50.21; 372/29.014; 362/97.2; 385/31; 385/33; 385/38

(58) Field of Classification Search .................... 385/92, 385/93, 94, 31, 33, 38, 88, 89; 362/97.2; 372/29.01, 29.011, 29.012, 29.014, 29.015, 372/29.016, 21, 22, 50.21; 349/61, 95
See application file for complete search history.

(56) References Cited

U.S. PATENT DOCUMENTS

| | | | | |
|---|---|---|---|---|
| 5,011,247 A | * | 4/1991 | Boudreau et al. | 385/33 |
| 6,526,079 B1 | * | 2/2003 | Watterson et al. | 372/32 |
| 6,825,930 B2 | * | 11/2004 | Cronin et al. | 356/328 |
| 6,847,661 B2 | * | 1/2005 | Jerman et al. | 372/20 |
| 7,039,076 B2 | * | 5/2006 | Kane et al. | 372/6 |
| 2002/0085594 A1 | * | 7/2002 | Pezeshki et al. | 372/20 |
| 2004/0052278 A1 | * | 3/2004 | Kane et al. | 372/25 |
| 2009/0059116 A1 | * | 3/2009 | Furuya et al. | 349/61 |

FOREIGN PATENT DOCUMENTS

| | | | | |
|---|---|---|---|---|
| JP | 2001-8945 | 1/2001 | | 385/92 X |
| JP | 2002-169480 | 6/2002 | | 385/92 X |
| JP | 2003-310653 | 11/2003 | | 385/92 X |
| JP | 2005-46247 | 2/2005 | | 385/92 X |
| JP | 2006-202703 | 8/2006 | | 385/92 X |
| JP | 2007-159740 | 6/2007 | | 385/92 X |

* cited by examiner

*Primary Examiner*—Brian M Healy
(74) *Attorney, Agent, or Firm*—Wenderoth, Lind & Ponack, L.L.P.

(57) ABSTRACT

The present invention comprises: a laser light source 101 operable to output a laser light; an optical component 114 operable to couple, to an optical fiber 126, the laser light outputted from the laser light source 101; an actuator 118 operable to hold the optical component 114; a photoreceiver 503 operable to monitor the laser light outputted from the optical fiber; and a control device 117 operable to drive the actuator 118 in accordance with a result of the monitoring by the photoreceiver 503, thereby controlling a position of the optical component 114.

16 Claims, 18 Drawing Sheets

LASER APPARATUS

BACKGROUND OF THE INVENTION

1. Field of the Invention

The present invention relates to a laser apparatus capable of coupling light, which is outputted from a laser light source, to an optical fiber, and then outputting the light.

2. Description of the Background Art

Display devices can be categorized into: a light emitting display device which emits light, such as an organic light emitting display device, a plasma display device or the like; and a light receiving display device which is not capable of emitting light and which requires a light source, such as a liquid crystal display device or the like. A general liquid crystal display device includes: two display boards provided with electric field generating electrodes; and a liquid crystal layer having dielectric constant anisotropy, which is provided between the two display boards. An electric field is generated in the liquid crystal layer by applying a voltage to the electric field generating electrodes; a light valve is formed by adjusting an intensity of the electric field by varying the voltage; and a desired image is obtained by adjusting a transmission factor of light passing through the liquid crystal layer. For this light, generally, a separately provided artificial backlight source is used.

A cold cathode fluorescent lamp (CCFL), which is provided at the rear of a liquid crystal panel and which uniformly irradiates the entire liquid crystal panel with light, is often used as a backlight source of a liquid crystal display device. Generally, the CCFL is used such that the light of the CCFL, which is incident on the side of a light guide plate, is substantially evenly outputted from the front of the light guide plate so as to be radiated on the back of the liquid crystal panel, i.e., edge light type, or such that multiple CCFLs are arranged at the back of the liquid crystal panel, and the CCFLs directly radiate the light on the liquid crystal panel through a diffuser panel, i.e., direct light type.

In recent years, in consideration of the environment and power saving, development of an image display device is advanced, in which a light-emitting diode (LED) or a laser, which does not use mercury and which consumes less power, is used as a light source. In particular, a laser is the most appropriate to be used as a light source of an image display device, not only because of its low power consumption but also from the viewpoint of image quality such as a color reproduction range or the like.

Meanwhile, in order to simplify a structure of an LCD television and to slim an LCD television, a lightbox or a light guide plate is usually used. Structures as disclosed in Japanese Laid-Open Patent Publications No. 2002-169480 (Patent Document 1) and No. 2006-202703 (Patent Document 2) are proposed as backlight devices using a lightbox or a light guide plate.

For example, Patent Document 1 proposes a system in which monochromaticity, polarized nature, and straightforwardness of laser light are used so as to cause the laser light to be: linearly reflected on a hologram mirror; incident on a lightbox; and then planarly radiated via a half mirror array.

Patent Document 2 proposes a system in which light sources are arranged in an array-like manner at the right and left to a light guide plate, and triangular-shaped portions provided at a bottom surface of the light guide plate cause light to be planarly radiated. In the case where laser lights whose polarization directions are uniform are used in these systems, an advantage is obtained in which by maintaining the polarization, a more efficient backlight can be realized as compared to a case where the laser lights are non-polarized lights.

However, in the system disclosed in Patent Document 1 in which the hologram mirror is used to reflect laser light, if the three primary colors RGB are used for laser light sources, reflection directions, at the hologram mirror, of laser lights of the respective colors are different from each other. This may cause color unevenness in distribution of light finally outputted from a light guide plate. Further, profiles of the laser lights are reflected in light intensity distribution of the laser lights having been reflected by a plane hologram mirror. Therefore, if the laser lights are, for example, Gaussian-shaped, brightness at a central portion of the light guide plate increases, and this causes unevenness in brightness, which is unfavorable.

In general, reflectivity of a hologram mirror is low since diffraction efficiency is low for a particular wavelength. This inevitably causes loss of light intensity. Furthermore, since half mirrors are used in the structure for causing laser light to rise two-dimensionally, reflectivity differences among the half mirrors are reflected in brightness distribution. Moreover, light intensity distribution of a light source is reflected in distribution of laser light having been reflected by the half mirrors. Accordingly, brightness unevenness due to a light source profile occurs in accordance with a pitch among the half mirrors. Still further, in the case of radiating light for a large area and for a short distance, it is necessary to provide a substantial number of half mirrors whose transmission properties are slightly different from each other. This is extremely unrealistic because a number of problems are caused, for example, considerable difficulty and a cost increase in manufacturing.

Also in the system disclosed in Patent Document 2 in which light sources are arranged in an array-like manner at the sides of a light guide plate, light source profiles are reflected in lights rising within the light guide plate, and brightness unevenness due to a combination of multiple light source profiles is caused. Further, in the case of using lasers as the light sources of Patent Document 2, laser lights entering the light guide plate arrive, due to straightforwardness of the laser lights, at an opposite side of the light guide plate to a side thereof which the laser lights have entered. Then, the laser lights are transmitted through the light guide plate and lost. Even if the laser lights are reflected using a reflective member or the like, the laser lights, which horizontally travel, keep traveling for a long distance while reflecting on the reflective member or the like, and then are absorbed by the light guide plate. This results in loss of light intensity. Meanwhile, in the case where the laser lights are widely incident near an entrance of the light guide plate, brightness increases near the entrance and this causes brightness unevenness. Thus, this system also has a number of problems.

SUMMARY OF THE INVENTION

Therefore, an object of the present invention is to provide a laser apparatus which is used as a light source of a display and which has high beam quality, high coupling efficiency, uniform brightness and little color unevenness and which can be formed by a small number of components with a low cost.

The present invention is directed to a laser apparatus operable to output a laser light from an optical fiber. In order to achieve the above object, one of the modes of the laser apparatus of the present invention comprises: a laser light source operable to output a laser light; an optical component operable to couple, to the optical fiber, the laser light outputted from the laser light source; an actuator operable to hold the optical component; and a control device operable to drive the actuator, thereby controlling a position of the optical component. By having a photoreceiver operable to monitor the laser light outputted from the optical fiber, the control device is able to drive the actuator in accordance with a result of monitoring by the photoreceiver and thereby control the position of the optical component.

A coupling lens or a diffuser element is suitable to be used as the optical component. Typically, the laser light source uses, as a fundamental wave, a laser light emitted from a fiber laser, and outputs a laser light that is obtained from wavelength-converting the fundamental wave by using a nonlinear optical element.

Preferably, the control device causes the actuator to vibrate at a frequency of 100 Hz to 1 kHz during a period in which the laser light source is lit. Based on an intensity of the laser light received by the photoreceiver, the control device shifts a position of the optical component, thereby determining a position at which the laser light enters the optical fiber. It is conceivable that the actuator is an electromagnetic actuator.

Preferably, an $M^2$ value of the laser light emitted from the laser light source is 2 or lower. In the case where the laser light source is a laser diode, the $M^2$ value of the laser light outputted from the laser diode light source is preferred to be 2 or lower for either one of or both a vertical direction and a horizontal direction with respect to an active layer.

A dispersion section may be provided at a core portion of the optical fiber, whereby spatial light intensity distribution may be uniformized. When a distance from a center of a fiber core of the optical fiber to a border between the fiber core and clad is r, and a beam radius of the laser light entering the optical fiber is $\omega$, it is desired that a light focus position at which the laser light is coupled to the optical fiber is set to be within a range of 0.25 (r-$\omega$) to 0.75 (r-$\omega$). A length of the optical fiber is 10 m or longer, and the optical fiber is coiled with a diameter of 150 mm or smaller. Alternatively, the length of the optical fiber is in a range of 10 m to 25 m. The optical fiber may be detachable by a connector.

In a liquid crystal display device comprising: a liquid crystal display panel; and a backlight illuminating device operable to illuminate the liquid crystal display panel from a back of the liquid crystal display, the laser apparatus of the present invention may be used as the backlight illuminating device.

According to the present invention, a laser apparatus, which has high beam quality, high coupling efficiency, uniform brightness and little color unevenness and which can be formed by a small number of components with a low cost, is realized.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
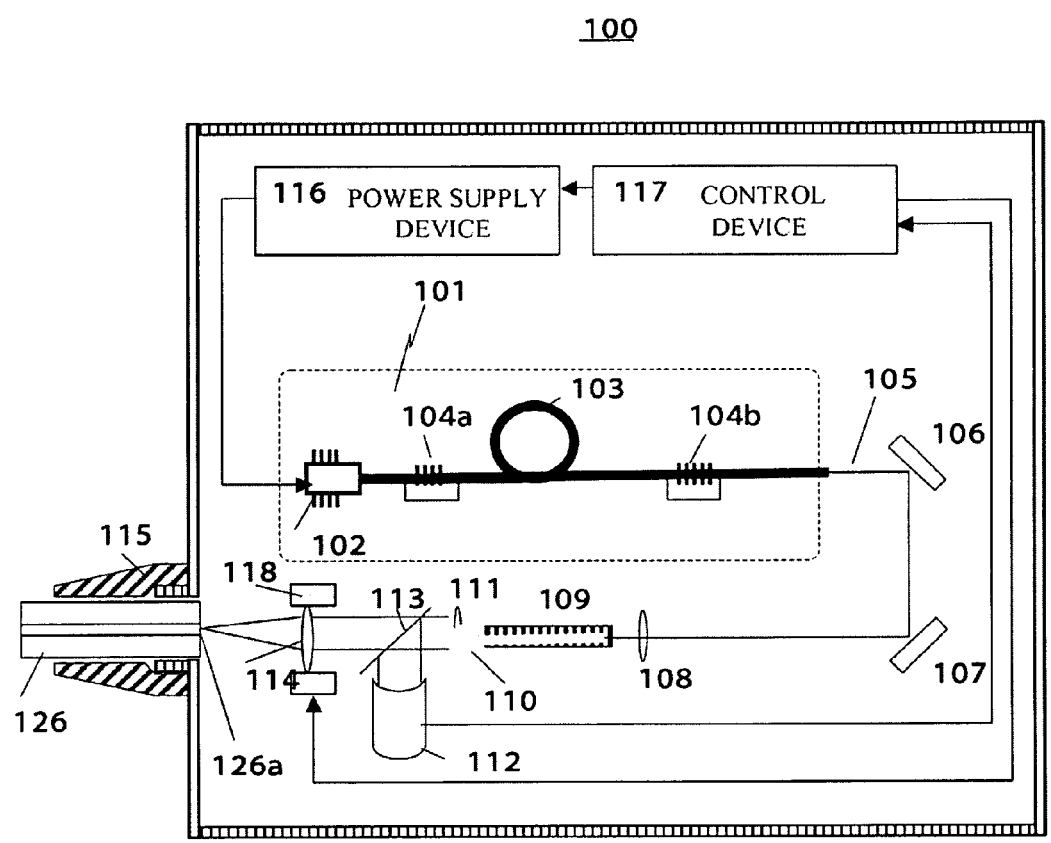
FIG. 1 shows a structure of a laser apparatus according to a first embodiment of the present invention.

Hereinafter, a laser apparatus according to embodiments of the present invention will be described with reference to the drawings. Note that, in the description below, descriptions of components that are denoted, in the diagrams, by the same reference numerals as those used for other components, may be omitted.

First Embodiment

FIG. 1 shows a structure of a laser apparatus 100 according to a first embodiment of the present invention. The laser apparatus 100 shown in FIG. 1 comprises: a fiber laser 101, dichroic mirrors 106 and 107, a condensing lens 108, a nonlinear optical device 109, a collimate lens 111, a photoreceiver 112, a beam splitter 113, a coupling lens 114, an actuator 118, a power supply device 116, a control device 117, a connector 115 and a transmission fiber 126.

The laser apparatus 100 according to the first embodiment uses green laser light which is obtained by generating a second harmonic by converting, using the nonlinear optical device 109, a wavelength of a fundamental wave that is laser light generated by the fiber laser 101. This allows the laser apparatus 100 to be used for lighting of a liquid crystal panel, for example.

The fiber laser 101 comprises an excitation laser light source 102, Yb (ytterbium) doped fiber 103, and fiber gratings 104a and 104b which act as resonant mirrors. It is desired that the Yb doped fiber 103 is a polarization-maintaining double-clad fiber. It is also desired that alaserresonator includes a single polarization mechanism for causing a polarization direction of the fundamental wave to be a single polarization direction.

A fundamental wave 105 outputted from the fiber laser 101 is reflected by the dichroic mirrors 106 and 107, and then condensed by the condensing lens 108 so as to enter the nonlinear optical device 109. In the present embodiment, Periodically Poled MgO-doped $LiNbO_3$ is used for the nonlinear optical device 109. By using Periodically Poled MgO-doped $LiNbO_3$, conversion efficiency is greatly increased in the conversion of the fundamental wave into the second-harmonic green laser light.

A second harmonic 110 generated by then on linear optical device 109 is converted by the collimate lens 111 into parallel light, and then coupled to the transmission fiber 126 via the coupling lens 114. Further, the second harmonic 110 reflected by the beam splitter 113 is monitored by the photoreceiver 112. The transmission fiber 126 is connected to the laser apparatus 100 by the connector 115.

A feature of the present invention is that the coupling lens 114 is held by the actuator 118. The actuator 118 is a moving-coil electromagnetic actuator which vibrates in accordance with control by the control device 117. Also, the excitation laser light source 102 is driven by the power supply device 116 and the control device 117. The coupling lens 114 may be replaced with a diffuser element.

Figure 2:
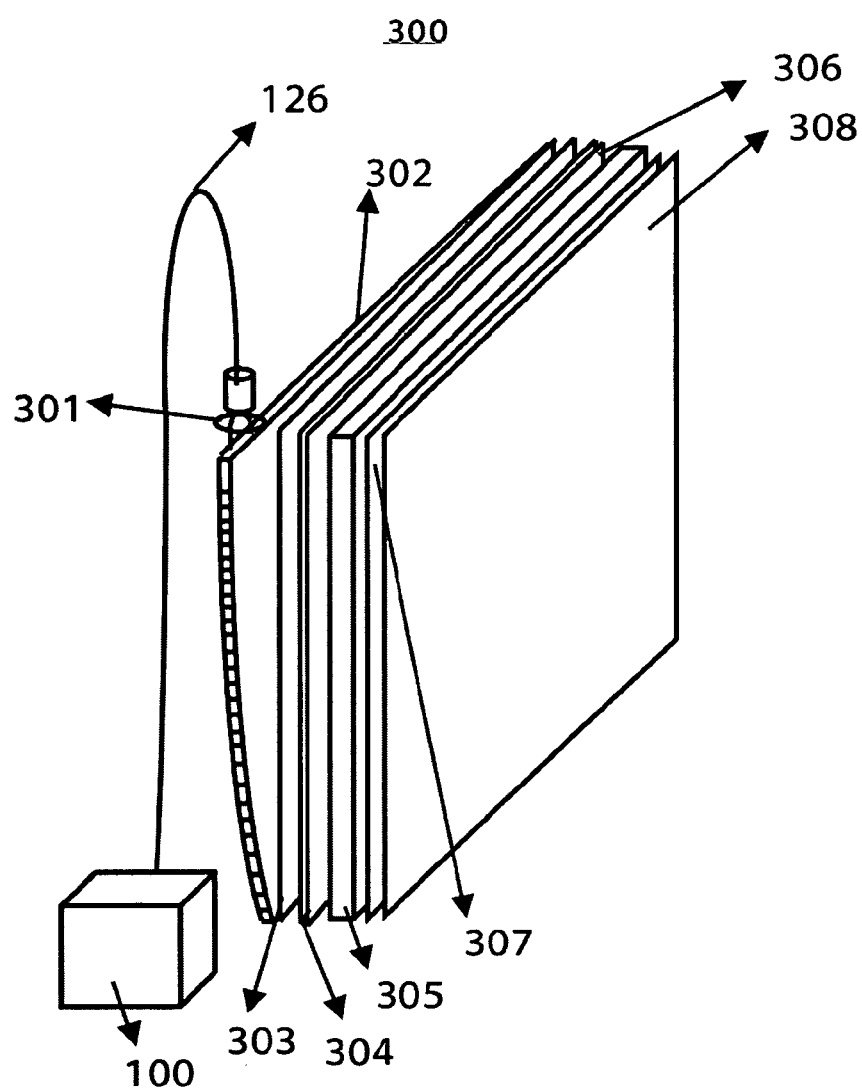
FIG. 2 shows an exemplary structure of a liquid crystal display using the laser apparatus of the present invention.

FIG. 2 shows an exemplary structure of a liquid crystal display 300 in which the laser apparatus 100 is used as a backlight source of a liquid crystal panel. The liquid crystal display 300 shown in FIG. 2 comprises the laser apparatus 100, the transmission fiber 126, a collimate lens 301, a light guide plate 302, a first diffuser panel 303, a second diffuser panel 304, a liquid crystal panel 305, a first polarization filter 306, a color filter 307, and a second polarization filter 308.

Laser light outputted from the laser apparatus 100 is coupled to the transmission fiber 126, and guided to the vicinity of the light guide plate 302. The laser light outputted from the transmission fiber 126 is converted by the collimate lens 301 into substantially parallel light. After polarization directions of the laser light are uniformized by a polarization beam splitter, a half-wavelength plate and a reducer which are not shown, the laser light enters the light guide plate 302. The laser light having entered the light guide plate 302 is converted to two-dimensional light by a beam conversion section provided in the light guide plate 302, and then transmitted through the first and second diffuser panels 303 and 304. Only light having a predetermined polarization direction is transmitted through the first polarization filter 306. Thereafter, the light is transmitted through the liquid crystal panel 305 such that the light is transmitted through each pixel at a predetermined light intensity. Then, the light is transmitted through the color filter 307 such that the light is transmitted through portions corresponding to the respective RGB colors. Further, the light travels through the second polarization filter 308 which is placed in crossed nicols with respect to the first polarization filter 306. As a result, a desired image is obtained. Here, depending on intensity distribution of the output beam from the transmission fiber 126, a state where an intensity of the laser light illuminating the liquid crystal panel is not uniform at a surface of the panel, i.e., brightness unevenness, occurs.

Figure 18:
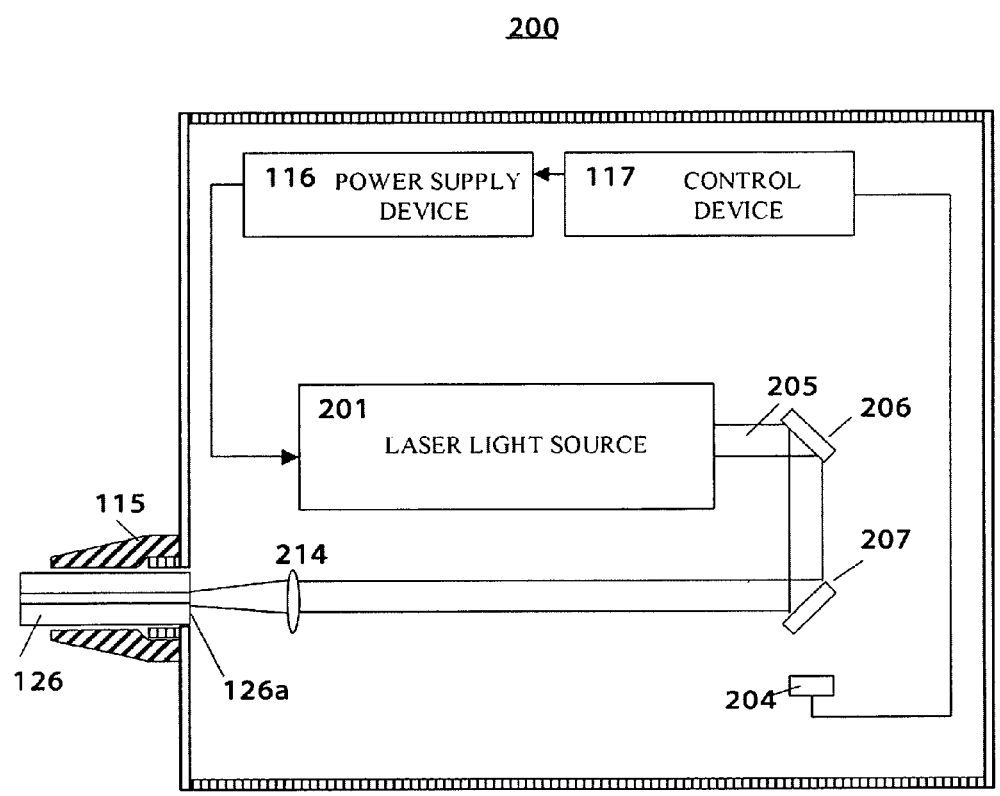
FIG. 18 shows a structure of a conventional laser apparatus.

FIG. 18 shows a structure of a conventional laser apparatus 200. In the structure of the conventional laser apparatus 200, laser light 205 outputted from a laser light source 201 is reflected by dichroic mirrors 206 and 207, and then coupled to the transmission fiber 126 by a coupling lens 214. In this case, light emitted from the conventional laser apparatus 200 is such that a lateral mode thereof is multimode and a beam quality ($M^2$ value) thereof is 5 or greater which is significantly low. At an end face 126a of the transmission fiber 126, a diameter of the light is, even at its minimum, greater than a core diameter of the transmission fiber 126. Therefore, although efficiency of coupling to the transmission fiber 126 is low, the coupling efficiency is stable at approximately 70%±5% even if a core position of the transmission fiber 126 is slightly deviated from a proper position.

Figure 19A:
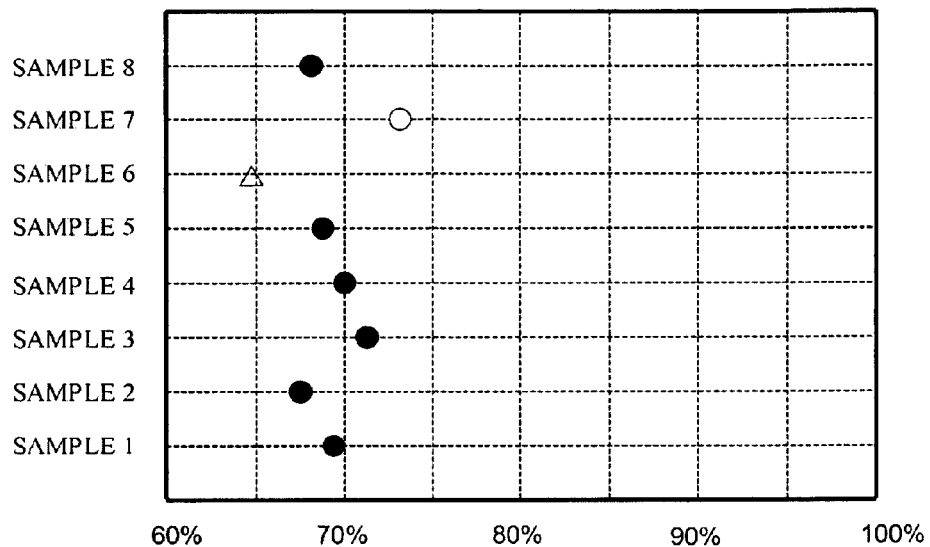
FIGS. 19A and 19B are diagrams in each of which variation in coupling efficiency of a conventional laser apparatus is plotted.

FIG. 19A is a diagram in which variation in coupling efficiency, in the case where the conventional laser apparatus 200 is connected to samples 1 to 8 of the transmission fiber 126, is plotted. The horizontal axis represents the coupling efficiency, and names of the samples of the transmission fiber 126 are indicated along the vertical axis. Since the fiber end face 126a does not have anti-reflection coating or the like, coupling efficiency of 94% to 95% is obtained when there is no loss other than reflection loss at the end face. Results shown in FIG. 19A show that variation in the coupling efficiency from the sample 6 (indicated by Δ in the diagram) of the lowest coupling efficiency to the sample 7 (indicated by ○ in the diagram) of the highest coupling efficiency, is approximately 70±5%.

On the other hand, in the structure of the present embodiment in which the fiber laser 101 and the nonlinear optical device 109 are combined, laser light having a high beam quality, whose $M^2$ value is no greater than 2 (approximately 1.5 or lower), can be obtained. In the structure of the present embodiment, since the beam quality is high, efficiency in the wavelength conversion performed by then on linear optical device 109 can also be increased, which is also a feature of the present embodiment. However, in the case where the laser apparatus 100 according to the present embodiment is used, since a beam diameter of the condensed laser light can be kept small at the fiber end face 126a, the efficiency in the coupling to the transmission fiber 126 is susceptible to deviation of the core position of the transmission fiber 126 although the coupling efficiency can be increased.

Figure 19B:
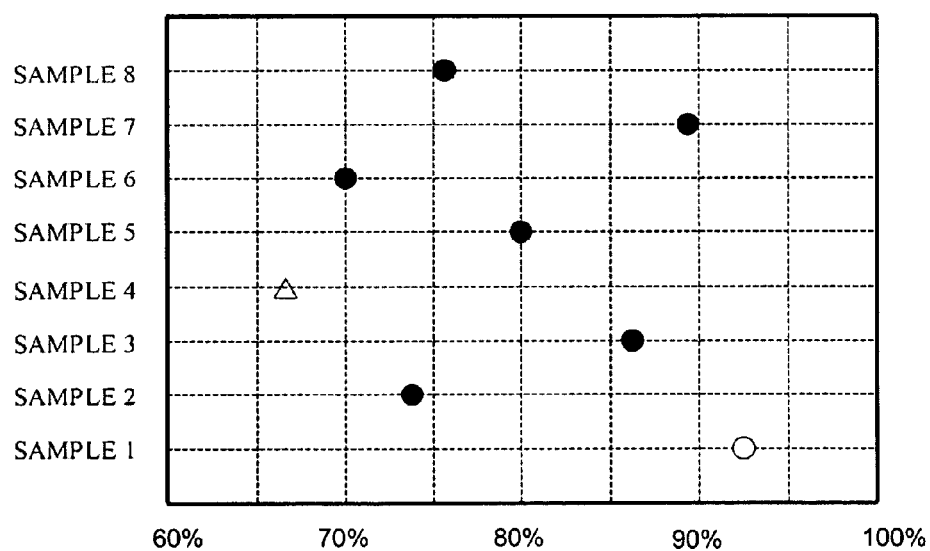

FIG. 19B is a diagram in which variation in coupling efficiency, in the case where the laser apparatus 100 according to the present embodiment, which is a combination of the fiber laser 101 and the nonlinear optical device 109, is connected to the samples 1 to 8 of the transmission fiber 126, is plotted. A highest coupling efficiency is no lower than 90%, which is better than that of the conventional laser apparatus 200. However, a lowest coupling efficiency is 67%, which is as low as that of the conventional laser apparatus 200. Thus, variation in the coupling efficiency is substantial. As described above, in the laser apparatus 100 according to the present embodiment, the coupling efficiency deteriorates if the core position of the transmission fiber 126 deviates from a beam condensing position. It is known that the deviation is caused by a manufacturing error of the transmission fiber and a positioning error that occurs when the connector is attached to the end of the fiber.

In the present embodiment, in order to suppress the deterioration in coupling efficiency, which is caused by the above-described displacement of the core position, the coupling lens 114 held by the actuator 118 is used. A feature of the present embodiment is to have a mechanism for, when the transmission fiber 126 is connected to the fiber laser 101, aligning the coupling lens 114 while monitoring an intensity of the laser light outputted from the transmission fiber 126.

Hereinafter, a laser light coupling position correcting mechanism for aligning the coupling lens 114 will be described.

Figure 3:
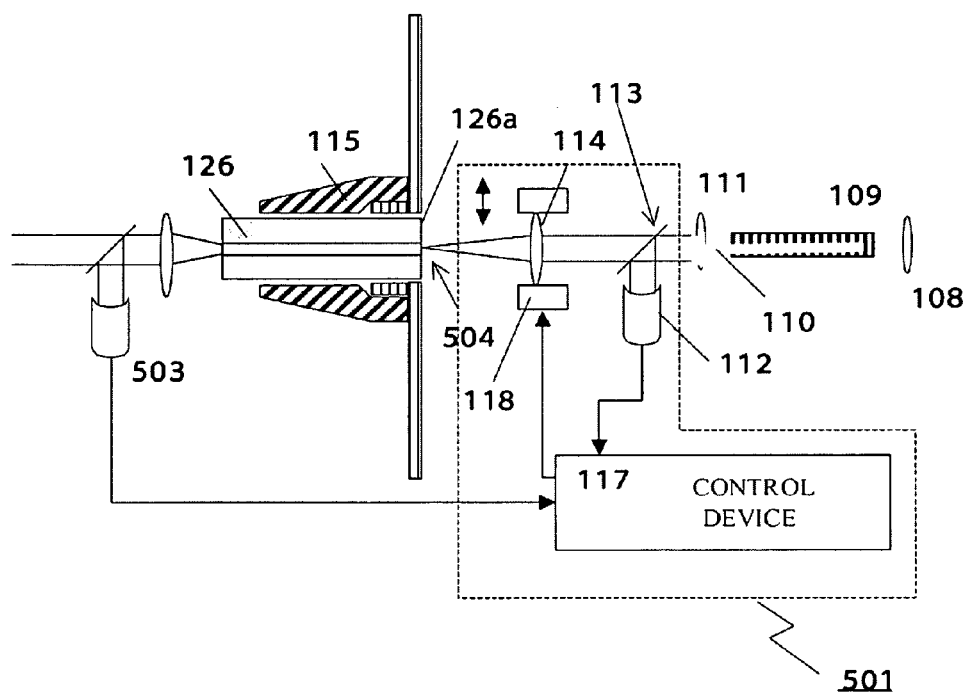
FIG. 3 is a schematic diagram showing a structure of a laser light coupling position correcting mechanism and showing a vicinity thereof.

FIG. 3 is a schematic diagram showing a structure of a laser light coupling position correcting mechanism 501 and showing a vicinity thereof. The laser light coupling position correcting mechanism 501 comprises the photoreceiver 112, the beam splitter 113, the coupling lens 114, the actuator 118 and the control device 117.

The second harmonic 110 outputted from the nonlinear optical device 109 is monitored by the photoreceiver 112. Based on a result of the monitoring by the photoreceiver 112, the control device 117 controls an output of the excitation laser light source 102 (not shown in FIG. 3) such that the output of the second harmonic 110 is constant. Laser light having passed through the transmission fiber 126 is also monitored by a photoreceiver 503. Based on an intensity of the light having passed through the transmission fiber 126, control is performed using the actuator 118 so as to optimize the position of the coupling lens 114.

Figure 4A:
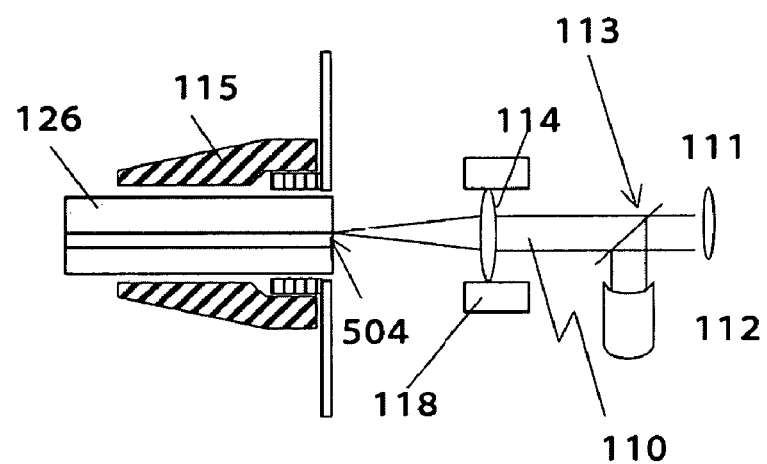
FIGS. 4A and 4B are diagrams for describing an operation mechanism of the laser light coupling position correcting mechanism.
Figure 4B:
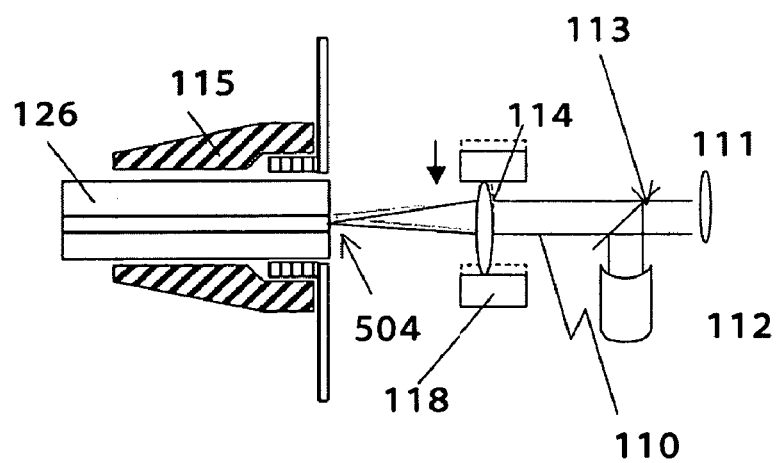

FIGS. 4A and 4B illustrate a manner of correcting the position of the coupling lens 114, in which the core position of the transmission fiber 126 is displaced downward as shown in the diagrams.

When the coupling lens 114 is at its central position (i.e., an initial position) as shown in FIG. 4A, a focus point of the light condensed by the coupling lens 114 is at an upper portion of the core of the transmission fiber 126. Here, by shifting, using the actuator 118, the position of the coupling lens 114 to be lower, the light focus point can be shifted to be lower. Manufacturing variation of a connector-attached fiber is approximately ±5 μm, and a deviation margin of the lens position is approximately ±10 μm. These are fully accommodated by this correction manner since a displacement amount of this correction manner is approximately ±15 μm.

Figure 5:
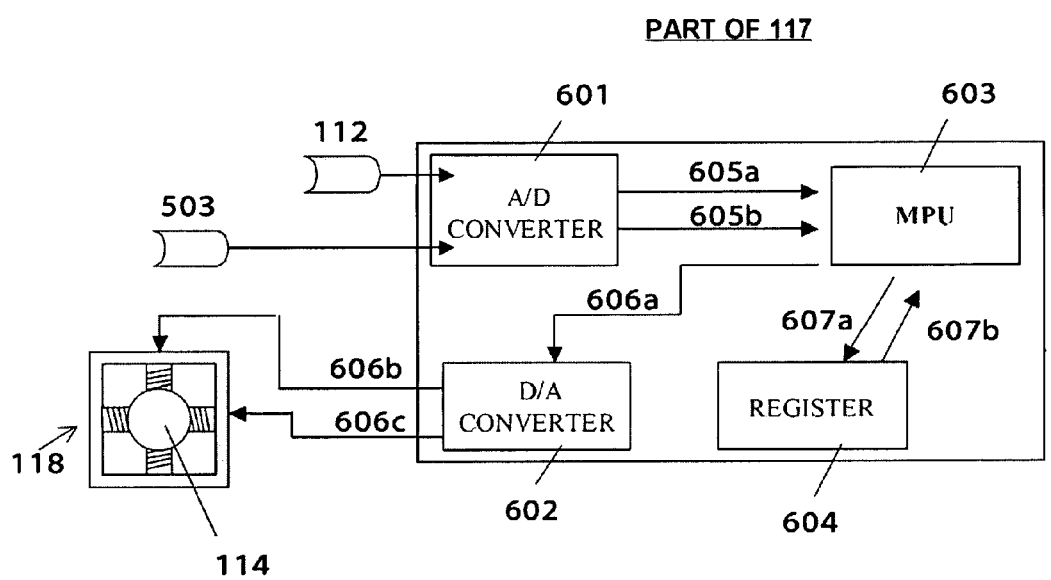
FIG. 5 shows an example of an internal structure of a control device 117.

FIG. 5 shows an example of an internal structure of the control device 117.

The control device 117 comprises: an A/D converter 601 for converting a signal, which is provided from the photoreceiver 112 that measures an intensity of the laser light entering the transmission fiber 126, to a digital signal, and for converting a signal, which is provided from the photoreceiver 503 that measures an intensity of the laser light outputted from the transmission fiber 126, to a digital signal; an MPU 603 for processing signals 605a and 605b having been converted to digital signals by the A/D converter 601; a register 604 for storing processed numerical values; and a D/A converter 602 for converting, from a digital value to an analogue voltage value, a drive signal 606a to be provided to the actuator 118.

Figure 6:
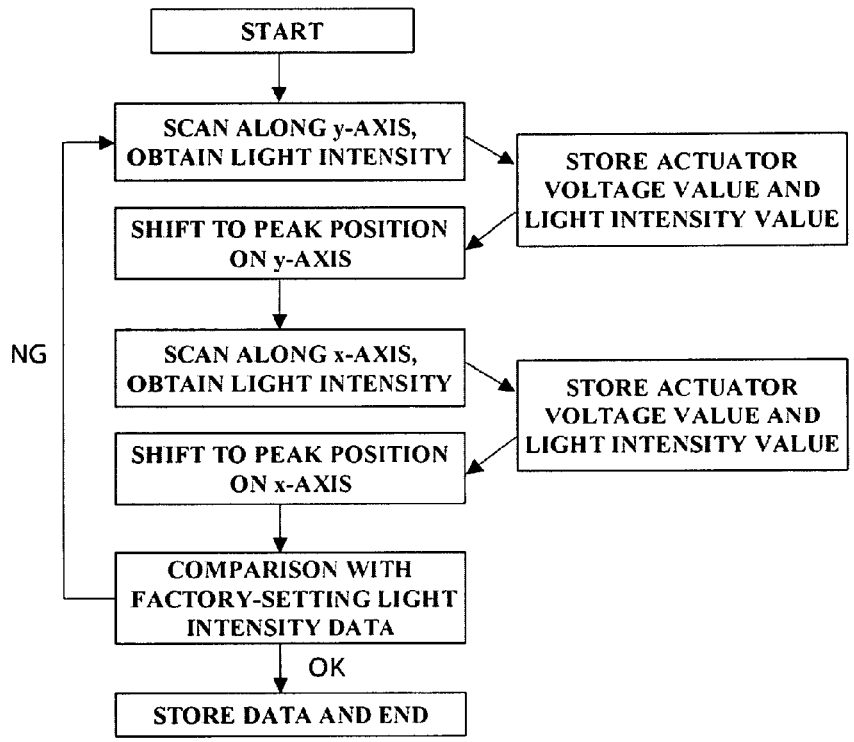
FIG. 6 is a diagram for describing a correction algorithm of the laser light coupling position correcting mechanism.

FIG. 6 illustrates a correction algorithm for the laser light coupling position correcting mechanism 501 to adjust the lens position.

First, a fiber aligning instruction is inputted via a control panel of the laser apparatus 100. Here, the photoreceiver 503 is provided at an exit end of the transmission fiber 126. Next, a drive signal is inputted to the actuator 118, and a beam scan is performed along a y-axis direction of the transmission fiber 126. Here, drive voltages and intensities of the laser light that is outputted from the transmission fiber 126 are stored in the register 604, and a drive voltage at which the intensity of the laser light becomes maximum is searched for.

Next, the actuator 118 is shifted to a position at which the intensity of the laser light becomes maximum for the y-axis direction, and a beam scan is performed along an x-axis direction. Also here, intensities of the laser light outputted from the transmission fiber 126 are stored in the register 604, and a drive voltage at which the intensity of the laser light becomes maximum is searched for.

Finally, the intensities of the laser light before and after entering the transmission fiber 126 are compared, and a result thereof is compared to factory-setting light intensity data stored in the register 604. If a result of the comparison indicates a difference of ±10% or smaller, positioning data (i.e., a value of the voltage applied to the actuator 118) is stored, and the fiber aligning ends. If the difference is greater than ±10%, the beam scan is performed again from a current value, and the aligning operation is performed twice. If the comparison result still shows a difference greater than ±10%, an error signal is generated so as to prevent the fiber laser 101 from being used.

Figure 7:
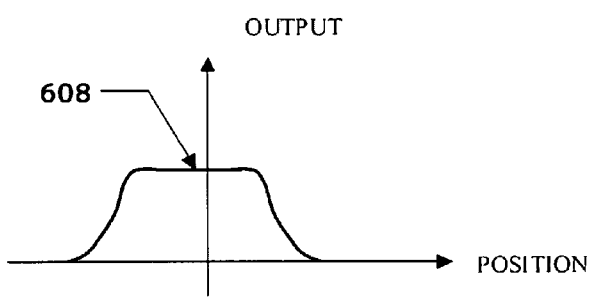
FIG. 7 shows a relationship between a position of a fiber of the laser light coupling position correcting mechanism and laser light intensity.

FIG. 7 is a diagram in which: the fiber core is set as an origin; the horizontal axis represents the amount of variation of the focus point; and the vertical axis represents the light intensity. As shown in FIG. 7, the peak of the laser light intensity becomes flat when the focus point of the beam is near the core of the transmission fiber 126. Therefore, it is important to select such a central value of the peak as indicated by an arrow 608.

Figure 8:
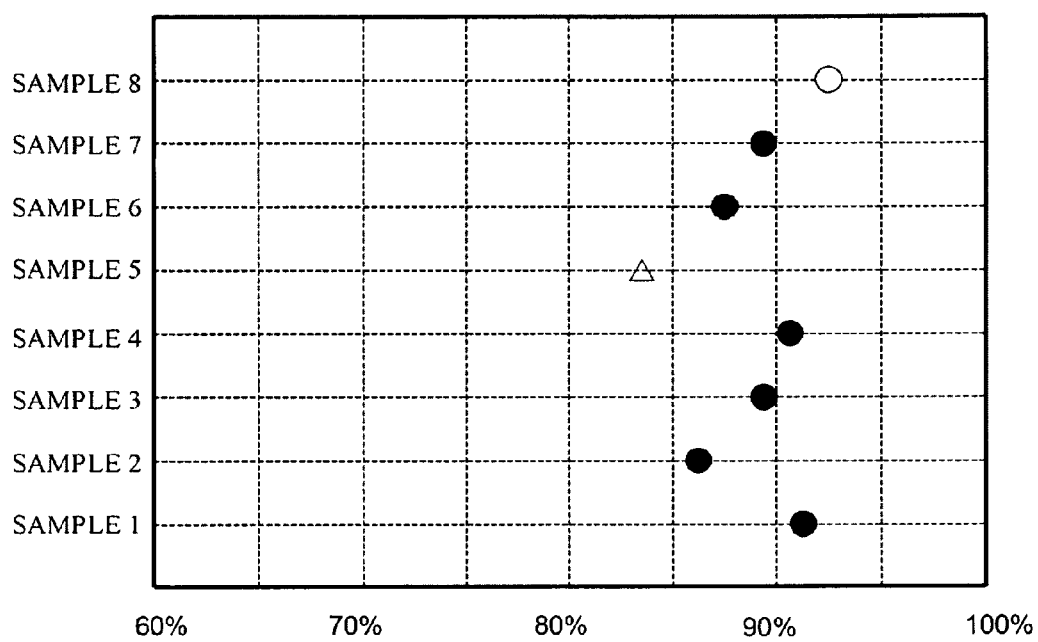
FIG. 8 is a diagram in which variation in coupling efficiency, in the case where the laser light coupling position correcting mechanism is used, is plotted.

FIG. 8 is a diagram in which variation in coupling efficiency, in the case where the laser light coupling position correcting mechanism 501 is used, is plotted. As shown in FIG. 8, the use of this mechanism of the present invention greatly reduces the variation such that the variation is 83% to 92%. Note that, by providing, within a slit lamp, the photoreceiver 503 for monitoring the laser light having passed through the transmission fiber 126, a real-time control can be performed. However, in practice, to provide the photoreceiver 503 in the laser apparatus 100 and to perform alignment before use or when the transmission fiber is exchanged, will suffice.

Second Embodiment

Next, a method for improving variation in intensity distribution of the laser light outputted from the transmission fiber 126, will be described.

Figure 9A:
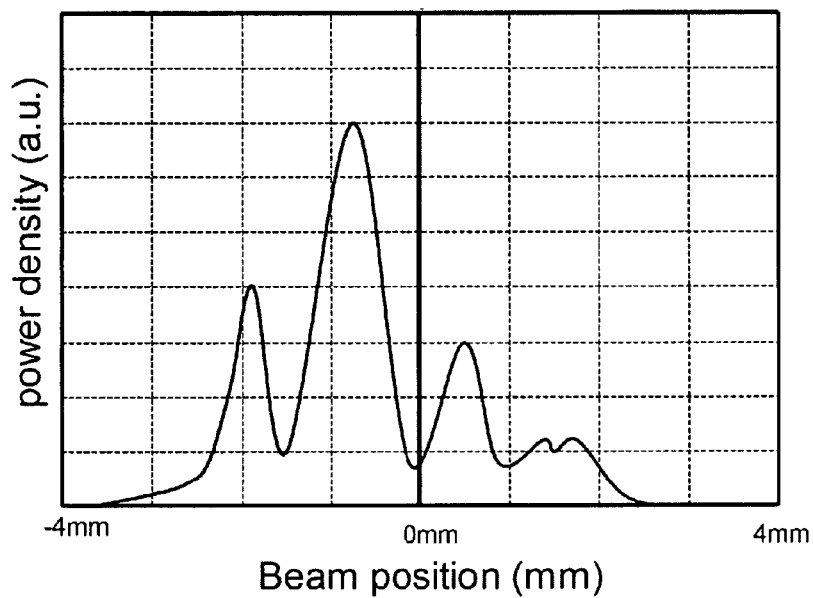
FIGS. 9A and 9B each show a profile of intensity distribution of light outputted from a fiber of the laser apparatus according to the first embodiment.
Figure 9B:
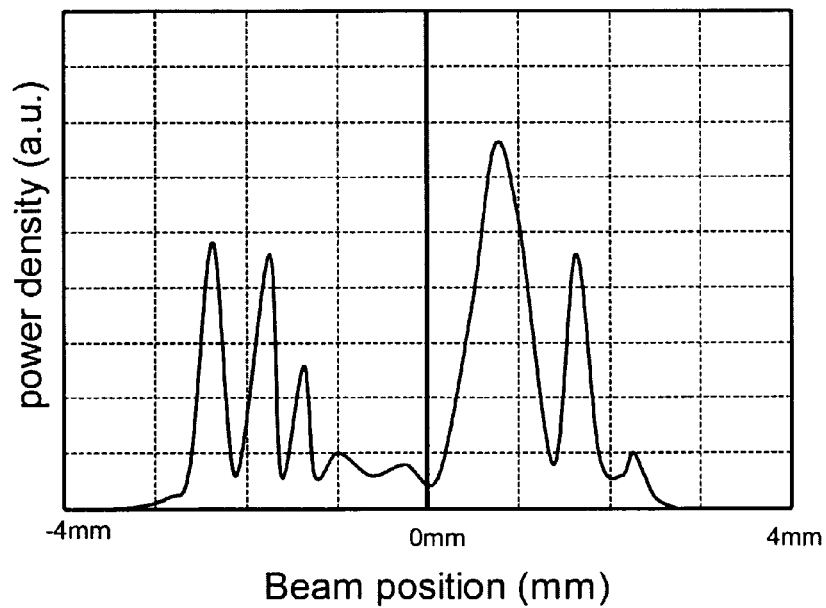

FIGS. 9A and 9B each show an example of variation in intensity distribution (lateral mode). Such variation as shown herein appears noticeably when high-quality laser light whose beam quality ($M^2$ value) is 2 or lower is used, which causes brightness unevenness on a display. It is also known that a profile of the intensity distribution changes when the transmission fiber 126 is displaced.

Figure 10:
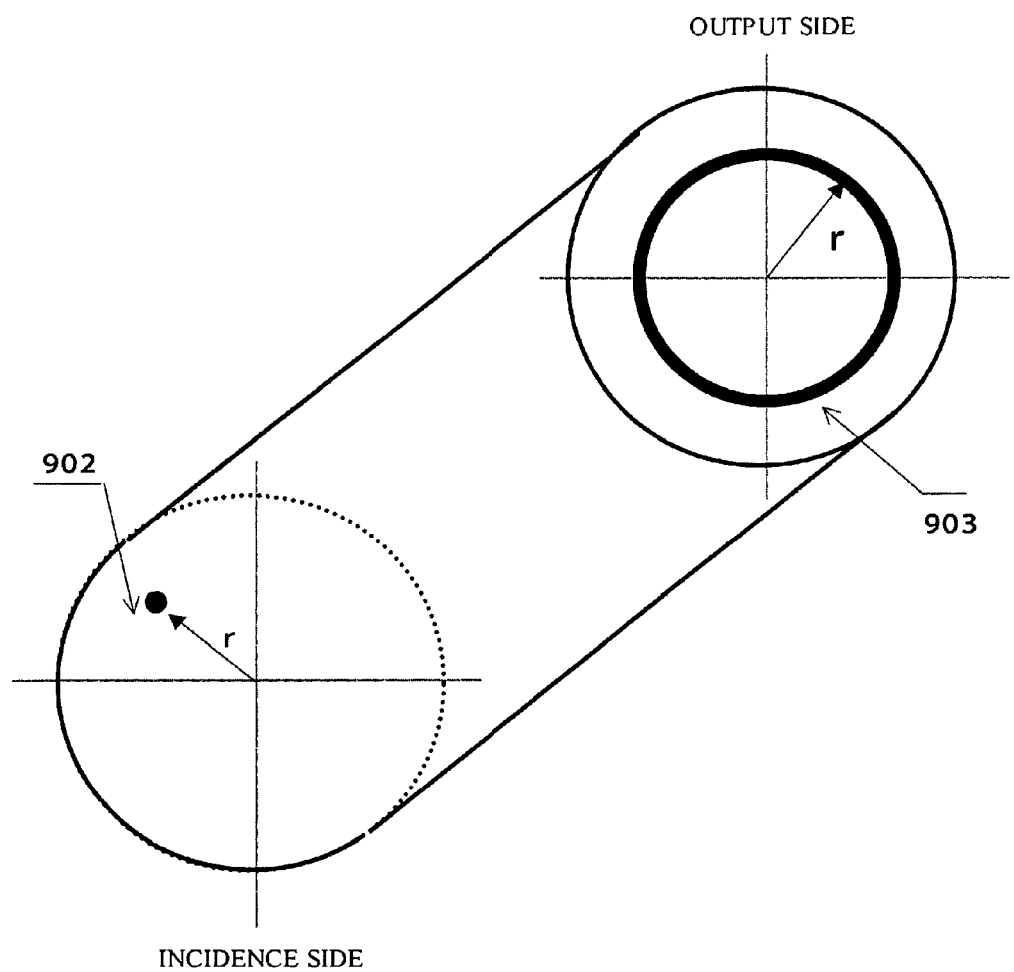
FIG. 10 is a diagram for describing a relationship between a position at which laser light enters a transmission fiber and a position at which the laser light is outputted from the transmission fiber.

Positions on the core of the transmission fiber 126, from which the laser light was outputted, were observed in relation to positions on the core of the transmission fiber 126, on which the laser light was incident. As a result, as shown in FIG. 10, it has been discovered that when the laser light is incident on a point 902 that is remote from the center of the fiber core by a distance r, light intensity at the output side increases at a ring-shaped portion 903 whose radius is r. Based on this, the mechanism of the present embodiment improves the intensity distribution variation by time varying the incident position, i.e., the distance r from the center of the fiber core to the incident position.

An intensity distribution reduction correction mechanism will be described with reference to FIG. 11. This mechanism is almost the same as the laser light coupling position correcting mechanism described in the first embodiment.

The coupling lens 114 is held by the actuator 118. Here, by superimposing a sinusoidal wave or a square wave on a voltage signal provided to the actuator 118, a light focus point 504 of the second harmonic 110 condensed by the coupling lens 114 can be caused to slightly tremor. In an experiment, the intensity distribution was greatly improved by causing the actuator 118 to vibrate at 100 Hz to 1 kHz by approximately ±5 µm at the maximum. A tremor direction of the light focus point may be a linear direction. There is no necessity to cause two-dimensional tremor. The same effect can be obtained by changing, using the actuator 118, a light incidence angle on the fiber end face 126a of the transmission fiber 126.

Figure 12:
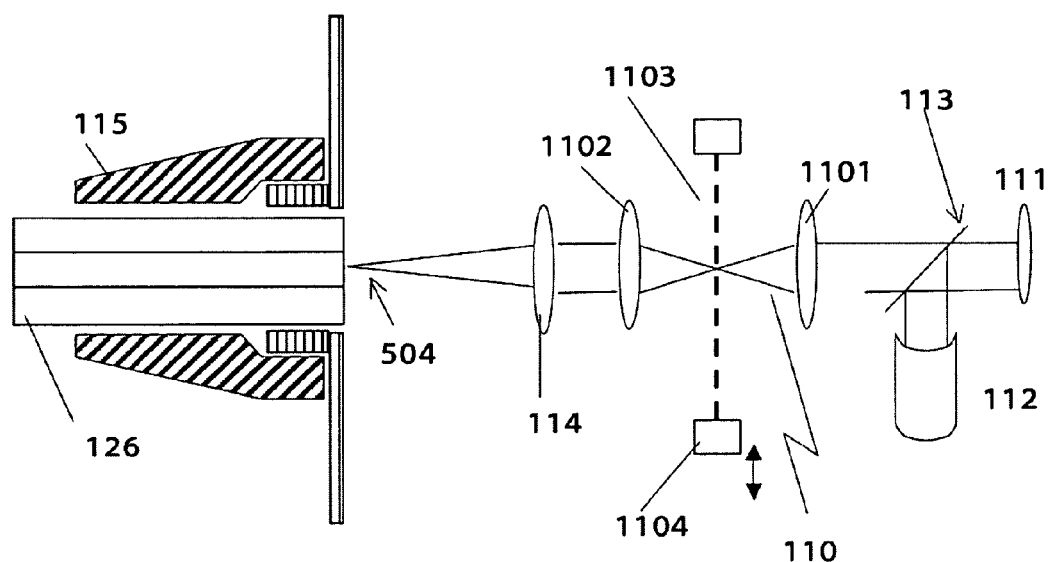
FIG. 12 illustrates an operation mechanism of another intensity distribution reduction correction mechanism.

A mechanism shown in FIG. 12, which is different from the first embodiment, also allows the same effect to be obtained.

The mechanism shown in FIG. 12 comprises: the collimate lens 111 for collimating the second harmonic 110; the photoreceiver 112; a condensing lens 1101 for condensing laser light; a collimate lens 1102 for converting the condensed light to parallel light; the coupling lens 114; the connector 115; the transmission fiber 126; a diffuser plate 1103 which acts as a correction mechanism; and a diffuser plate oscillating mechanism 1104. A diffusing angle of the diffuser plate 1103 is approximately 5 degrees. The diffuser plate 1103 is provided at a light focus point at which the second harmonic 110 condensed by the condensing lens 1101 is focused, and is caused to vibrate at 100 Hz to 1 kHz. An actuator or a piezoelectric element can be used for the diffuser plate oscillating mechanism 1104. Here, in practice, a frequency is desired to be 100 Hz to 1 kHz since high-frequency sound occurs at a high frequency of 1 to 2 kHz.

Figure 11:
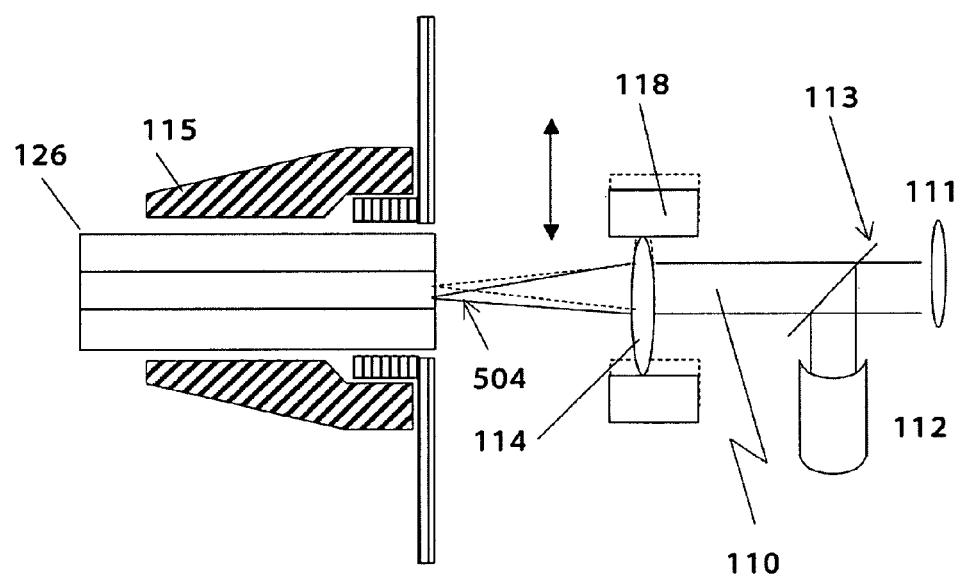
FIG. 11 illustrates an operation mechanism of an intensity distribution reduction correction mechanism.
Figure 13:
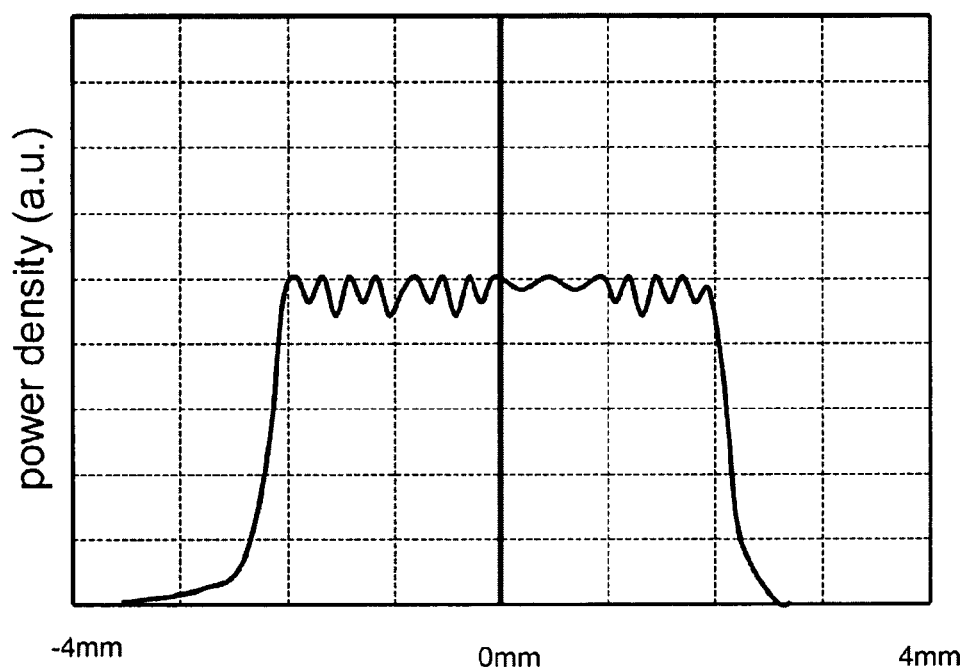
FIG. 13 shows a profile of intensity distribution of light outputted from a fiber of a laser apparatus according to a second embodiment of the present invention.

FIG. 13 shows a profile, obtained after the mechanism shown in FIG. 11 has improved the intensity distribution, of a beam outputted from the transmission fiber 126. FIG. 13 shows that uniform intensity distribution is obtained, and that a so-called far-field pattern (FFP) beam profile is obtained. It has been confirmed that also by the method using the diffuser plate as shown in FIG. 12, a profile having a similar shape is obtained and thus a similar result is obtained.

Third Embodiment

Conventionally, there are proposed methods in which laser light whose $M^2$ value is 5 or greater is used and a profile of the beam outputted from a fiber is time-averaged to obtain a top-hat shaped profile. However, in the case where laser light having a high beam quality, whose $M^2$ value is small such as 2 or smaller as in the present invention, is condensed in the conventional methods in which a fiber is caused to simply vibrate, not a far-field pattern profile as shown in FIG. 13 but a triangular shaped profile is obtained.

Therefore, described in a third embodiment is a method in which such variation in intensity distribution is improved by providing a number of dispersion sections at a core portion of the transmission fiber 126. To be specific, a method, in which short-length fibers are connected to form the transmission fiber 126, is proposed as a method in which dispersion sections are provided.

Figure 14:
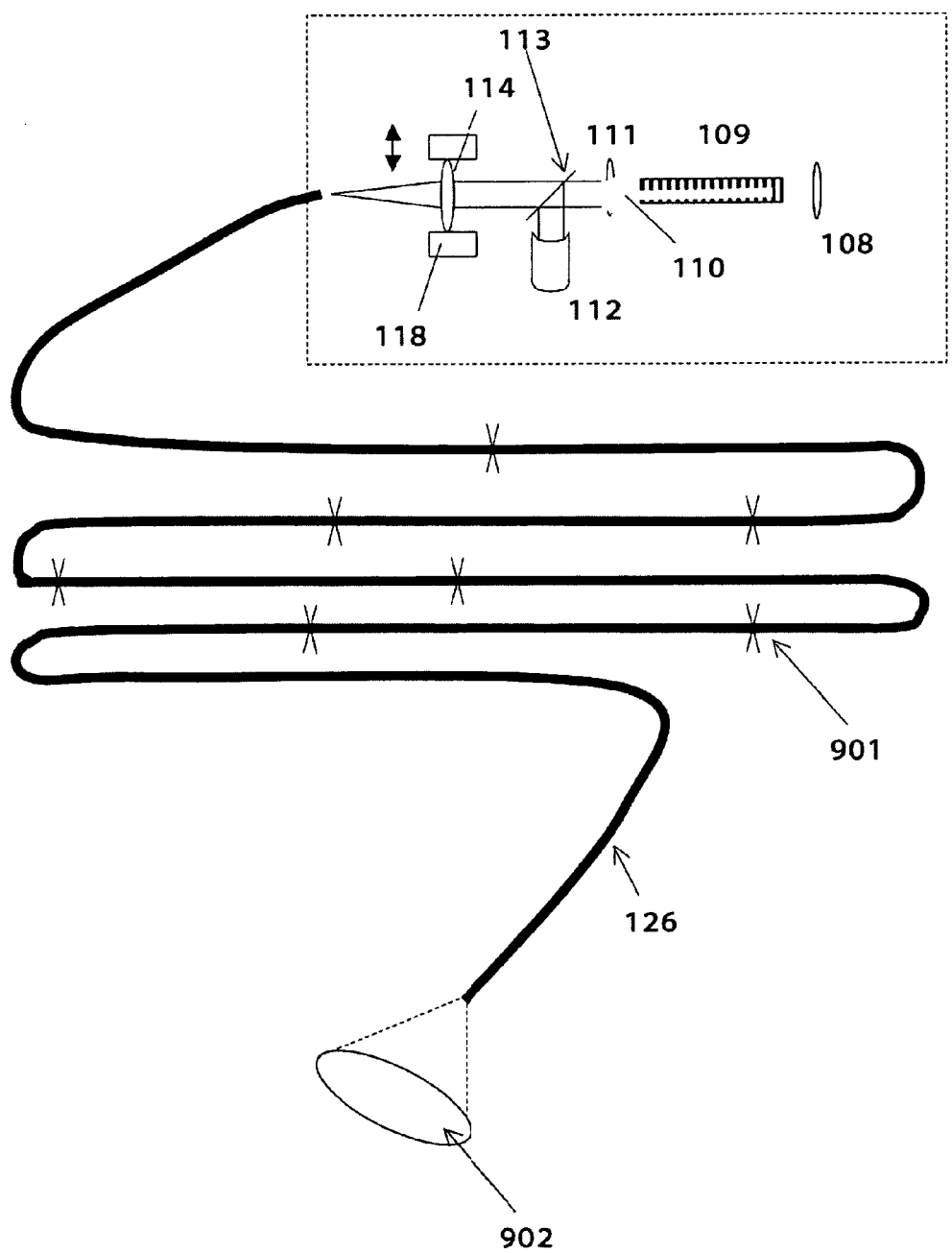
FIG. 14 shows a structure of a laser apparatus according to a third embodiment of the present invention.
Figure 15:
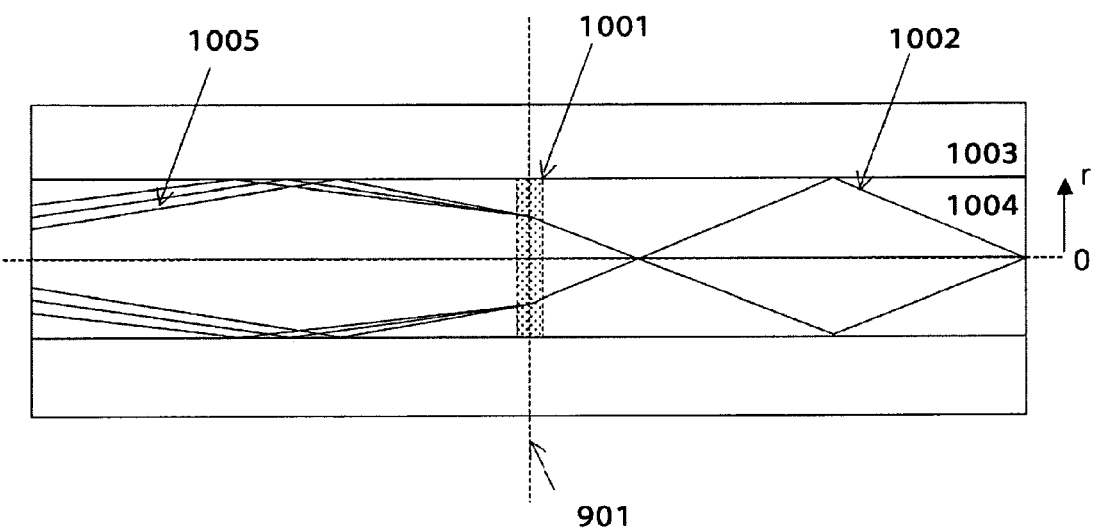
FIG. 15 is a schematic diagram a transmission fiber near a dispersion section and showing laser light traveling through the transmission fiber.

FIG. 14 is a schematic diagram showing a structure of the transmission fiber 126 to be used in a laser apparatus according to the third embodiment of the present invention. FIG. 15 is a schematic diagram showing the transmission fiber 126 near a dispersion section 1001 and showing laser light 1002 traveling through the transmission fiber 126.

Although a full length of the transmission fiber 126 is approximately 2 m, this two-meter length fiber is realized by fusion splicing short-length fibers. The number of fusion-spliced portions 901 (each indicated by X in the diagram) is 7 or similar. At each fusion-spliced portion 901, glass with which the fibers are formed melts when the fibers are fusion spliced, and this causes a difference in a refraction index. Due to such difference in a refraction index (i.e., due to the dispersion sections 1001), the laser light 1002 guided through the core portion is dispersed. As a result of the laser light varying in its angle when passing through the dispersion sections 1001, the laser light 1005 having passed through the dispersion sections 1001 provides an effect as if laser light having various NA values was guided.

The above-described effect reduces variation in the light intensity distribution in a cross-section direction of the fiber. The variation in the light intensity distribution is reduced each time the laser light passes through the fusion-spliced portion. In this manner, the light intensity distribution can be uniformized.

Figure 16:
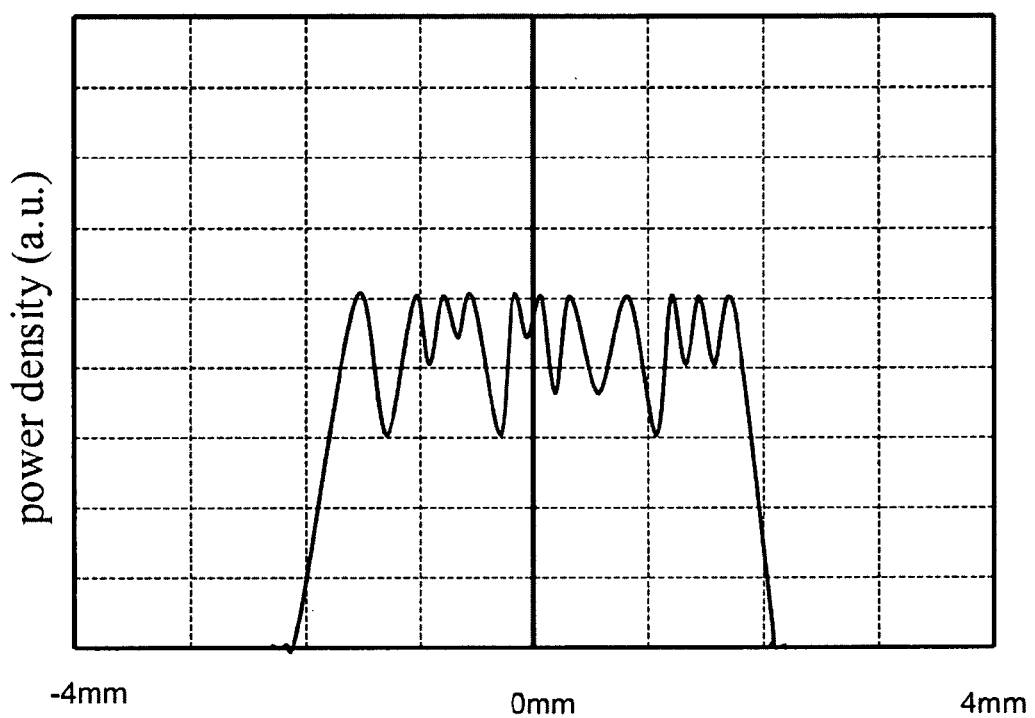
FIG. 16 shows a profile of intensity distribution of light outputted from a fiber of the laser apparatus according to the third embodiment.
Figure 17A:
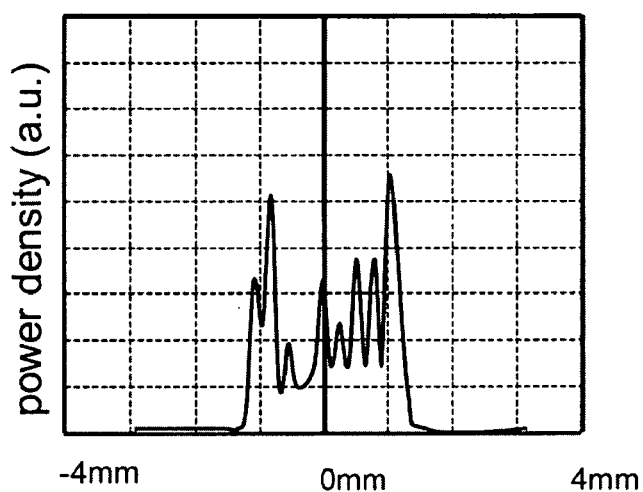
FIGS. 17A to 17C show profiles of intensity distribution in the case where the number of dispersion sections is 3, 7 and 10, respectively.
Figure 17B:
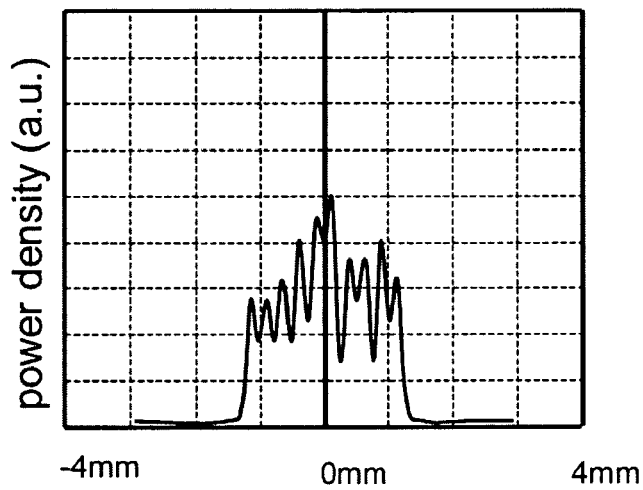
Figure 17C:
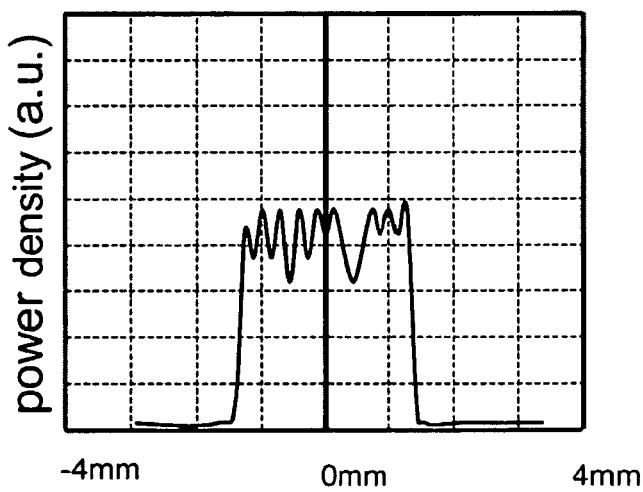

As a result of using the transmission fiber 126 that is formed by fusion splicing the fibers, the far-field pattern of the laser light outputted from the transmission fiber 126 is, as shown in FIG. 16, uniformized as compared to the pattern shown in FIG. 9. Thus, it has been confirmed that using this structure is effective. FIGS. 17A to 17C show intensity distributions in the case where the number of dispersion sections 1001 is 3, 7 and 10, respectively. As shown in FIGS. 17A to 17C, intensity unevenness is reduced in accordance with an increase in the number of dispersion sections 1001. For example, providing three or more dispersion sections 1001 is enough in the case of a laser apparatus for a liquid crystal display.

The method for forming each dispersion section 1001 may be the one in which air bubbles are formed at a fusion-spliced portion when fibers are fusion spliced, or the one in which fibers are connected by the connector 115. However, loss at the connecting portions is greater in these methods as compared to the method described in the present embodiment where the fibers are fusion spliced. Therefore, it is desired to use the method described in the present embodiment.

Further, in the case of forming the transmission fiber 126 as described in the present embodiment, when, in the schematic diagram of FIG. 15, the center of the fiber is a coordinate 0; a border between the fiber core and clad is coordinate r; and a beam radius of the entering laser light is ω, a light focus position at which the laser light is coupled to the transmission fiber 126 is desired to be within a range of 0.25 (r-ω) to 0.75 (r-ω). By setting the light focus position to be within this range, the intensity distribution can be uniformized without affecting the efficiency in coupling the laser light to the transmission fiber 126.

Even if the dispersion sections 1001 as described herein are not provided within the fiber, the far-field pattern of the laser light outputted from the transmission fiber 126 can be uniformized, by setting the length of the transmission fiber 126 to be 10 m or longer and coiling the transmission fiber 126 with a diameter of 150 mm or smaller so as to cause a reflection angle of the laser light traveling through the transmission fiber 126 to vary. However, as compared to the method where the dispersion sections 1001 are provided, the uniformizing effect in this method is smaller, and the intensity distribution is such that the intensity is large at the central portion of the fiber and small at the peripheral portion of the fiber. Note that, in this method, the length of the fiber is desired to be, when taking guiding loss in the fiber and the like into account, 10 m to 25 m in the case where a wavelength of the laser light is 500 nm to 650 nm.

In the above first to third embodiments, a silica-based step-index fiber whose core diameter is 50 µm or 105 µm is used as the transmission fiber 126. However, a different optical fiber may be used in accordance with a slit lamp 204. The above-described variation in the intensity distribution noticeably appears when a transmission fiber whose core diameter is 100 μm or smaller is used. Therefore, the structure described in the present embodiment is particularly effective in the case where a transmission fiber whose core diameter is 100 μm or smaller is used.

Further, in the above first to third embodiments, a green laser, whose laser light entering the transmission fiber 126 has a beam quality ($M^2$ value) of 1.3, is used. However, the effects of the above-described structures can be sufficiently obtained if the laser light whose $M^2$ value is 2 or lower is used.

Still further, in the above first to third embodiments, used as the laser light entering the transmission fiber 126 is a result of wavelength-converting a fundamental wave light that is provided from the fiber laser 101. However, laser light outputted from a semiconductor laser may be used instead. In this case, the effects are sufficiently obtained if the $M^2$ value of the laser light is 2 or lower for either one of or both a horizontal axis direction and a vertical axis direction with respect to an active layer. Here, a beam scanning direction is desired to be orthogonal to an axis direction for which the $M^2$ value is smaller.

Still further, although, in the above first to third embodiments, a moving-coil-type electromagnetic actuator is used as the actuator 118 for displacing the coupling lens 114 that is a component of a coupling optical system, an actuator using an ultrasonic motor may be used instead. However, in terms of control, it is desired to use the electromagnetic actuator since the electromagnetic actuator is capable of managing incident position information by using an applied voltage value.

While the invention has been described in detail, the foregoing description is in all aspects illustrative and not restrictive. It is understood that numerous other modifications and variations can be devised without departing from the scope of the invention.

What is claimed is:

1. A laser apparatus operable to output a laser light from an optical fiber, the laser apparatus comprising:
    a laser light source operable to output a laser light;
    an optical component operable to couple, to the optical fiber, the laser light outputted from the laser light source;
    an actuator operable to hold the optical component; and
    a control device operable to drive the actuator, thereby controlling a position of the optical component, wherein the control device causes the actuator to vibrate at a frequency of 100 Hz to 1 kHz during a period in which the laser light source is lit.

2. The laser apparatus according to claim 1, further comprising
    a photoreceiver operable to monitor the laser light outputted from the optical fiber, wherein
    the control device drives the actuator in accordance with a result of monitoring by the photoreceiver, thereby controlling the position of the optical component.

3. The laser apparatus according to claim 1, wherein the optical component is a coupling lens.

4. The laser apparatus according to claim 1, wherein the optical component is a diffuser element.

5. The laser apparatus according to claim 1, wherein
    the laser light source uses, as a fundamental wave, a laser light emitted from a fiber laser, and outputs a laser light that is obtained from wavelength-converting the fundamental wave by using a nonlinear optical element.

6. The laser apparatus according to claim 1, wherein the laser light source is a semiconductor laser.

7. The laser apparatus according to claim 2, wherein
    based on an intensity of the laser light received by the photoreceiver, the control device shifts the position of the optical component, thereby determining a position at which the laser light enters the optical fiber.

8. The laser apparatus according to claim 1, wherein the actuator is an electromagnetic actuator.

9. The laser apparatus according to claim 1, wherein an $M^2$ value of the laser light emitted from the laser light source is 2 or lower.

10. The laser apparatus according to claim 6, wherein
    an $M^2$ value of the laser light outputted from the semiconductor laser is 2 or lower for either one of or both a vertical direction and a horizontal direction with respect to an active layer.

11. The laser apparatus according to claim 1, wherein a dispersion section is provided at a core portion of the optical fiber, whereby spatial light intensity distribution is uniformized.

12. The laser apparatus according to claim 1, wherein
    when a distance from a center of a fiber core of the optical fiber to a border between the fiber core and clad is r, and a beam radius of the laser light entering the optical fiber is ω, a light focus position at which the laser light is coupled to the optical fiber is in a range of 0.25 (r-ω) to 0.75 (r-ω).

13. The laser apparatus according to claim 1, wherein a length of the optical fiber is 10 m or longer, and the optical fiber is coiled with a diameter of 150 mm or smaller.

14. The laser apparatus according to claim 1, wherein a length of the optical fiber is in a range of 10 m to 25 m.

15. The laser apparatus according to claim 1, wherein the optical fiber is detachable by a connector.

16. A liquid crystal display device comprising:
    a liquid crystal display panel; and
    a backlight illuminating device operable to illuminate the liquid crystal display panel from a back of the liquid crystal display panel, wherein
    the laser apparatus according to claim 1 is used as the backlight illuminating device.

* * * * *